No. 620,390. Patented Feb. 28, 1899.
J. T. WELLS.
COMPOUND OR DETACHABLE GEAR FOR BICYCLES.
(Application filed Feb. 26, 1898.)
(No Model.)
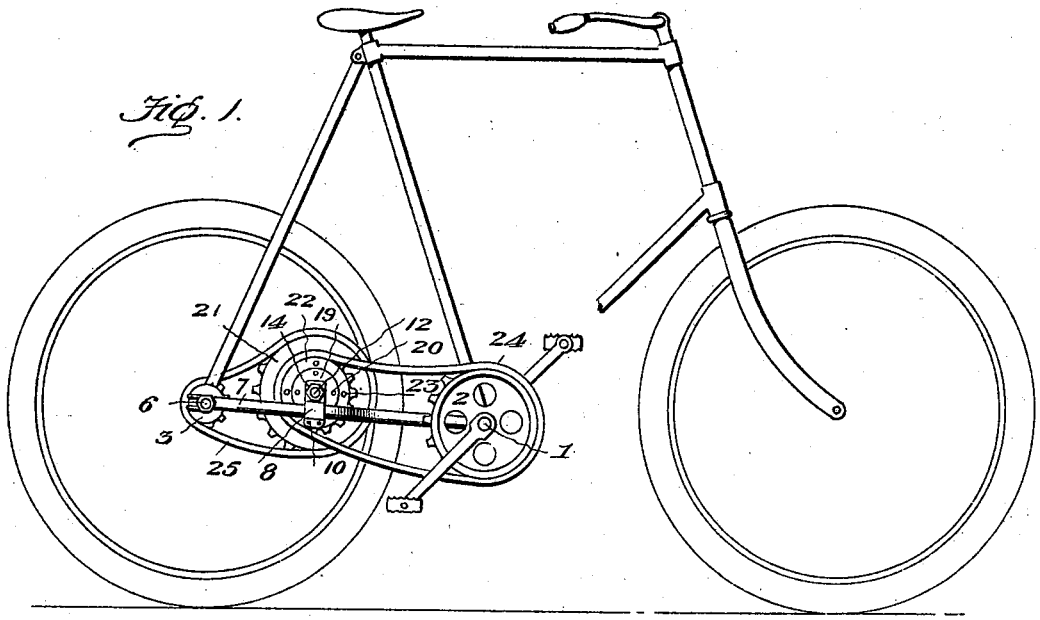
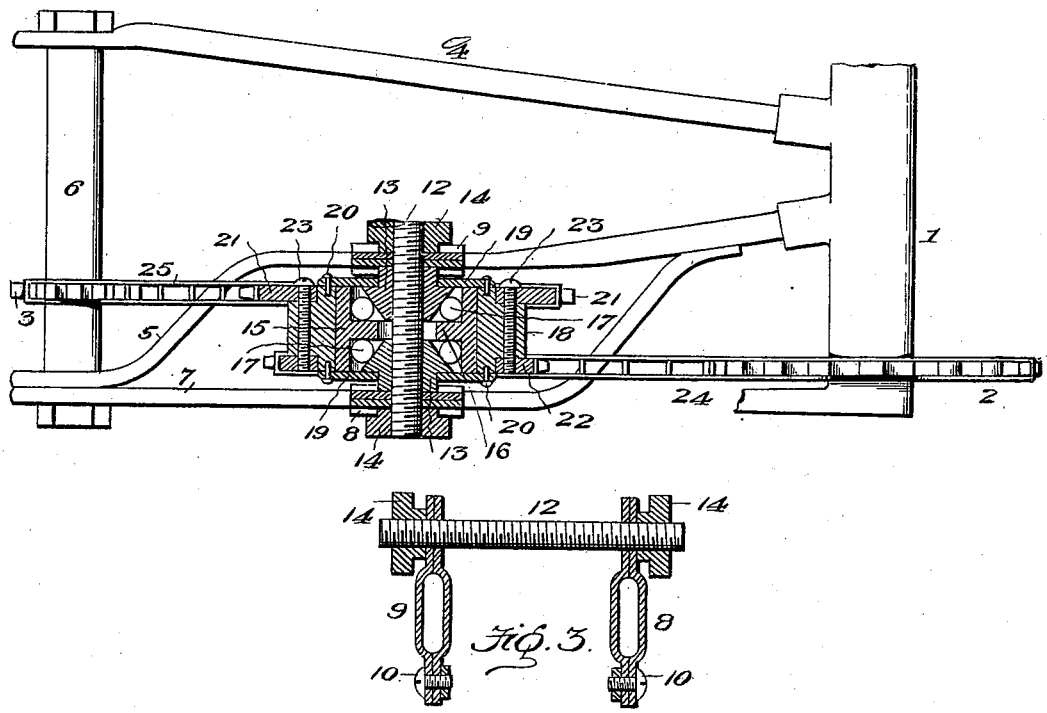
Witnesses
Inventor
John T. Wells
by
H. B. Willson & Co.
Attorneys
THE NORRIS PETERS CO., PHOTO-LITHO., WASHINGTON, D. C.

UNITED STATES PATENT OFFICE.

JOHN THOMAS WELLS, OF PATERSON, NEW JERSEY.

COMPOUND OR DETACHABLE GEAR FOR BICYCLES.

SPECIFICATION forming part of Letters Patent No. 620,390, dated February 28, 1899.

Application filed February 28, 1898. Serial No. 671,974. (No model.)

*To all whom it may concern:*

Be it known that I, JOHN THOMAS WELLS, a citizen of the United States, residing at Paterson, in the county of Passaic and State of New Jersey, have invented certain new and useful Improvements in Compound or Detachable Gear for Bicycles; and I do declare the following to be a full, clear, and exact description of the invention, such as will enable others skilled in the art to which it appertains to make and use the same.

My invention relates to improvements in compound or detachable gearing for bicycles; and the object is to provide a simple, inexpensive, durable, and effective device of this class.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claim at the end of this specification.

The same reference characters indicate the same parts of the invention.

Figure 1 is a side elevation of an ordinary bicycle equipped with my improved driving-gear. Fig. 2 is a horizontal section through the sprocket-wheels. Fig. 3 is a detail section of the removable clamps.

1 denotes the crank-shaft; 2, the front sprocket and 3 the rear sprocket wheel.

4 and 5 represent the rear forks, the fork 5 being straight for about three-quarters of its length and then diverging laterally and rearwardly, where its end is secured to the rear axle 6.

7 denotes a third or auxiliary fork arranged on the outside of and in the same horizontal plane as the fork 5, its front end being detachably secured thereto, as shown, while its rear end is removably secured to the rear axle with the contiguous end of the fork 5.

8 and 9 denote two pairs of clamps adjustably secured to the forks 5 and 7, the lower ends of each pair of clamps being connected by screw-bolts 10 10 and the upper ends of both pairs by a transverse shaft 12, which is externally threaded its entire length.

13 13 denote the cone-bearing sleeves, and 14 14 the lock-nuts encompassing said shaft and by means of which said clamps are removably fixed on the forks.

15 represents an annular bearing-ring, T-shaped in cross-section, with its central rib 16 extending equidistant between the bearing-faces of the sleeves 13 13 to retain the two parallel annular series of bearing-balls 17 17 in place.

18 denotes an annular spider encompassing the bearing-ring 15, and 19 19 represent annular washer-guards secured to the opposite sides of the spider by the screws 20 20 and which serve the double purpose of a retaining-guide for the bearing-ring and a dust-guard for the ball-bearings.

21 denotes a large and 22 a small sprocket-wheel removably fixed on opposite sides of the spider by the screws 23 23, which extend transversely through both sprocket-wheels and spider.

24 denotes the sprocket-chain, extending from the large sprocket-wheel 2 to the smaller sprocket-wheel 22, and 25 denotes a similar chain connecting the large sprocket-wheel 21 with the smaller rear sprocket-wheel 3. By this connection it will readily be seen that a compound gear is produced, and as the sprocket-gears 21 and 22 are detachable any desired gear can be attained by observing the proper proportions in replacing them. In practice I prefer to make the spider of aluminium on account of its lightness and as there is no great amount of strength required at this point.

Having thus fully described my invention, what I claim as new and useful, and desire to secure by Letters Patent of the United States, is—

In a bicycle, the combination with the rear fork 5 formed with an offset, the auxiliary fork 7 having a reversely-formed offset and secured at its front end to said rear fork and having its rear end removably fixed to the rear axle, the parallel clamps 8 and 9 secured to said forks 5 and 7, the externally-threaded counter-shaft 12 fixed in said clamps, the cone-bearing sleeves 13 13 and jam-nuts 14 14, adjustably secured on said counter-shaft, the T-shaped bearing-ring 15 encompassing said cones and the bearing-balls 17 arranged intermediate said cones and ring and on opposite sides of the ring-rib 16, the spider 18 encompassing said ring, the parallel washers 19 19 fixed to said spider and encompassing said bearing-sleeves, substantially as shown and described.

In testimony whereof I have hereunto set my hand in presence of two subscribing witnesses.

JOHN THOMAS WELLS.

Witnesses:
G. E. FERRIS,
GEO. KNOBLOCH.